May 14, 1963
R. H. CARLSON
3,089,159
PROCESS FOR FORMING A FASTENER INCLUDING
THE STEP OF PIERCING AN UNWORKED
HEAD PORTION
Filed June 12, 1961
2 Sheets-Sheet 1
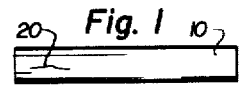
Fig. 1
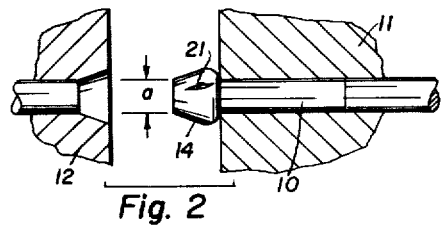
Fig. 2
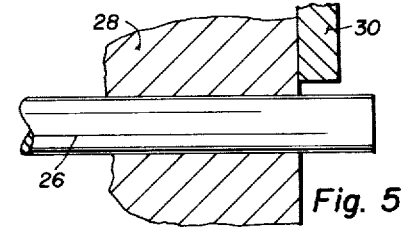
Fig. 5
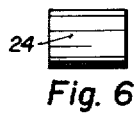
Fig. 6
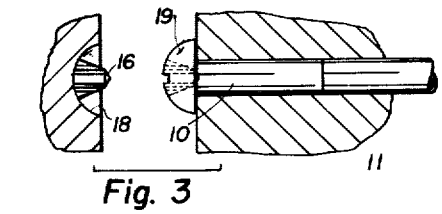
Fig. 3
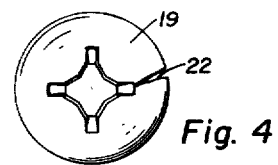
Fig. 4
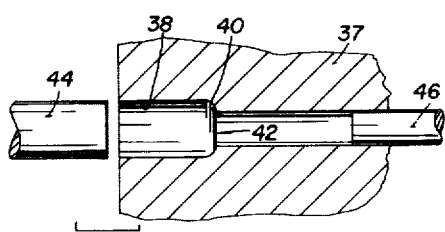
Fig. 8
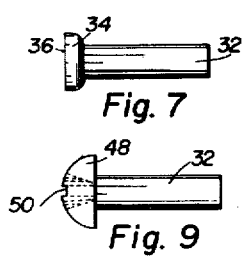
Fig. 7
Fig. 9
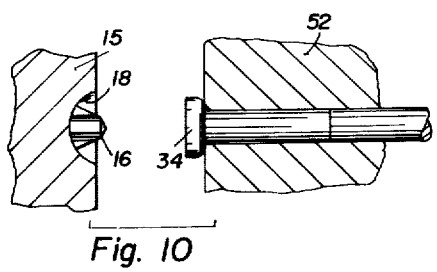
Fig. 10
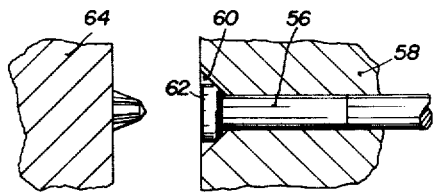
Fig. 11
INVENTOR.
RAYMOND H. CARLSON
BY
BUCKHORN, CHEATHAM & BLORE
ATTORNEYS

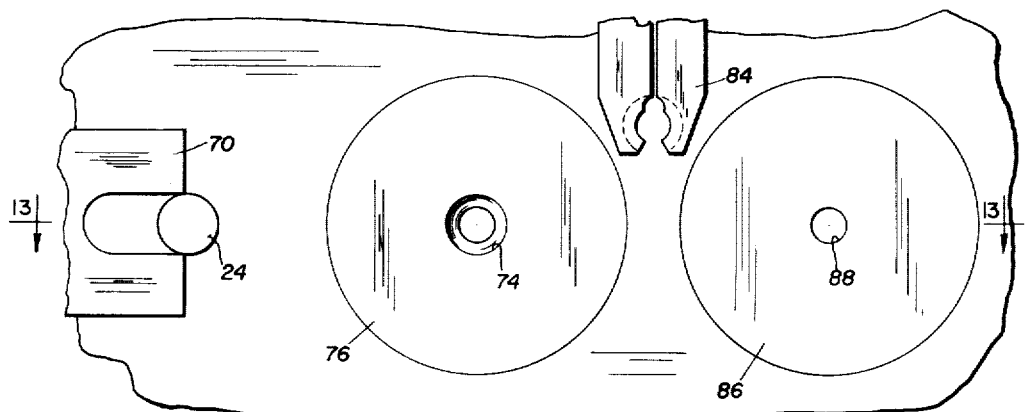
Fig. 12
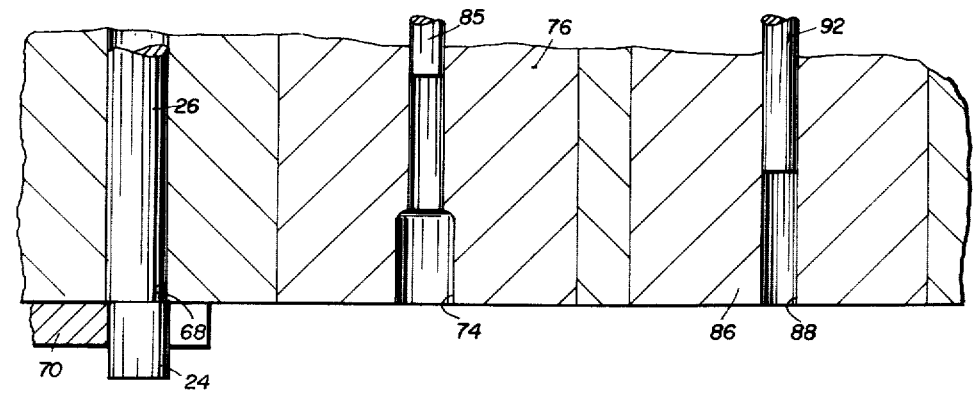
Fig. 13
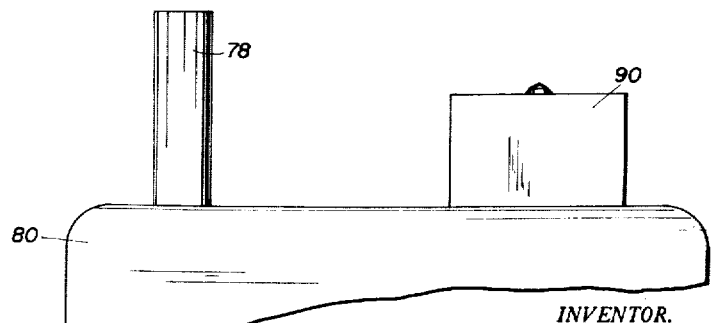
INVENTOR.
RAYMOND H. CARLSON
BY
BUCKHORN, CHEATHAM & BLORE
ATTORNEYS United States Patent Office 3,089,159
Patented May 14, 1963

3,089,159
PROCESS FOR FORMING A FASTENER INCLUDING THE STEP OF PIERCING AN UNWORKED HEAD PORTION
Raymond Harold Carlson, Rockford, Ill., assignor to Textron Industries, Inc., Rockford, Ill., a corporation of Delaware
Filed June 12, 1961, Ser. No. 116,362
3 Claims. (Cl. 10—27)

The present invention relates to the manufacture of headed fasteners and more particularly to threaded devices having an internal wrenching recess formed in the head thereof and completely threaded shanks.

Threaded fastening devices, such as recessed head screws, socket screws and other similar fasteners having a relatively large head with an internal wrenching recess and a small shank, have heretofore been manufactured from initial stock of substantially the same diameter as the finished shank by upsetting an end portion of such stock to provide a large metal mass from which the head could be finish shaped by further working. However, there are innumerable limitations inherent in such processes. Not only is expensive, specially processed, header wire required which is relatively free of surface cracks and fissures, but other problems are encountered making it difficult to accurately form recessed head products relatively free from defects, and of requisite mechanical strength. First of all, the preliminary upsetting and gathering of the stock to form the head causes the material to work harden. With some materials, the stock is hardened to such an extent that the subsequent forming steps cannot be performed without annealing the metal blank between steps.

Another disadvantage of the prior processes resides in the fact that in most instances the head of the fastening device is from two to three times the diameter of the wire from which the device is formed. It is difficult to upset and gather the necessary large mass of material first because the wire stock sometimes tends to deform nonuniformly during the upsetting process with resultant poor grain structure in the final product. Additional problems are created due to minor irregularities in the metallurgy of the wire stock and which adds to the likelihood of splitting of the initially formed bloom during the final punching operation. Problems are also involved in accurately forming the initial bloom on the blank which is required by conventional processes, not only as to symmetry, but also as to volume and shape. All of these problems, and many others, are successfully overcome by the process of the present invention.

It is an object of the present invention to provide a new and improved method of manufacturing headed fasteners which will permit a substantial reduction in the cost of manufacture thereof.

More particularly, it is an object of the present invention to provide a new and improved process for manufacturing threaded devices which will permit the use of less expensive stock material to form devices which by prior processes had to be manufactured of special, expensive alloys.

A further object of the invention is to provide a new and improved process which will cause a minimum wear upon the tools utilized in the process.

It is a further object to provide a process which will minimize the enlargement of defects in the stock material during the manufacture of headed devices.

Still another object is to provide a process which will permit the ready manufacture of headed devices from stainless steel and other metals having high work hardening characteristics.

Still another object is to provide a process for forming headed fastener blanks that may be performed on single blow heading machines.

Still further objects and advantages of the invention will become more apparent hereinafter.

In accordance with the illustrated embodiment, threaded devices having a head provided with a driver receiving recess are manufactured by a process which includes severing a cylindrical workpiece from a length of ordinary, inexpensive, wire stock having a diameter at least one-half, and preferably approximately three-fourths the diameter of the head of the device to be formed. In any event the wire stock should have a diameter at least about 50% greater than the maximum diameter of the recess to be formed in the head. This workpiece is first extruded in an extrusion die of a single blow heading machine to provide an elongate shank of substantially the diameter of the shank of the threaded device leaving a substantially unworked head part having a flat end surface and a diameter from one-half to three-fourths the diameter of the finished head. The workpiece is then moved to a holding die of the heading machine and the head part is then struck a single blow with a punch so as to finish form the driver receiving recess in the head part and upset the head part to provide the desired finished outer configuration. Because of the relatively slight amount of working performed upon the metal during the punching step, a more accurate head is formed, substantially free of cracks, of good grain structure, and accordingly, of high mechanical strength. Thus an improved product is formed at lower cost.

For a more detailed description of the invention, reference is made to the accompanying drawings and following specification wherein:

FIGS. 1, 2 and 3 illustrate the cold forging process conventionally used heretofore in making recessed head screw type fasteners;

FIG. 4 is a view of the head of a fastener made by a process such as shown in FIGS. 1, 2 and 3 showing how cracks may form therein;

FIG. 5 is a view showing the severing of a work blank from a strip of stock;

FIG. 6 is a view illustrating a blank utilized in the process of the invention and formed by the step in FIG. 5;

FIG. 7 is a view showing the workpiece after the next step in the manufacture of a recessed head threaded fastener in accordance with the invention;

FIG. 8 is a sectional view of a die structure which may be utilized in transforming the workpiece as shown in FIG. 6 to the semi-finished product shown in FIG. 7;

FIG. 9 is a view of a recessed round head fastener blank made by the process of the invention;

FIG. 10 is a sectional view of a die structure for forming the blank shown in FIG. 9;

FIG. 11 is a sectional view illustrating dies which may be used in the formation of recessed flat head fastener blanks in accordance with the process of the invention.

FIG. 12 is a fragmentary plan view of the die bed of a single blow heading machine for performing the process of the invention; and FIG. 13 is a view taken along line 13—13 of FIG. 12 showing further details of the heading machine for performing the process of the invention.

Reference is made first to FIGS. 1 to 3, inclusive, which illustrate a conventional process for manufacturing recessed head fasteners such as, for example, a round head fastener having a driver receiving recess such as is shown in the Phillips Patent No. 2,046,837. In accordance with this process, a workpiece 10 is severed from a length of wire stock having a diameter equal to the diameter of the shank of the completed fastener. The workpiece 10 is then transferred in the heading machine to a die 11 where it is struck a first blow by an upsetting punch 12. This is a metal gathering operation so as to provide a large, somewhat conical, metal mass or bloom 14 at one end of the workpiece from which the head can be shaped. This cone will have a diameter $a$ at its terminal end only very slightly larger than the diameter of the wire stock. This condition is inherent since the end of the workpiece must be confined during upsetting to prevent skewing of the workpiece which would cause asymmetrical upsetting.

The final punching step of the conventional process is shown in FIG. 3 which illustrates the formation of a so-called round head. In this case the bloom 14 is struck with a punch 15 having a nib 16 surrounded by concave shoulder 18. The nib 16 forms the desired shape of the recess in the fastener head and the shoulder 18 gives the final form to the fastener head 19, as illustrated in FIG. 4, by shaping it to the desired configuration which might be round, as shown, but could be oval, or otherwise. As can be seen by a comparison of FIGS. 2 and 3 the diameter $a$ of the upset cone is substantially the same as the maximum dimension across the wings of the nib 16. As will be apparent, considerable stress is imposed upon the upset head 14 when it is struck by the nib 16 and it has been necessary to use premium stock material to avoid splitting of the head upon punching.

In addition, the preliminary upsetting operation resulting in the formation of the bloom 14 is accompanied with various phenomena. One is that small surface cracks, fissures, or even scratches in the surface of the workpiece 10 are magnified and enlarged by the blooming process. Thus, for example, a small nick or scratch 20 in the surface of the workpiece 10 may be enlarged to an open crack 21 in the bloom 14. In the manufacture of certain types of external wrenching heads, these cracks may be of no consequence, but in the case of internal wrenching recesses, such as the cross-shaped Phillips recess, shown in FIG. 4, such cracks may be further enlarged in the final recess punching phase so that the finished product would be mechanically weak. If, for example, the crack 21 should coincide with one of the recess wings, the screw head would split open during the punching operation as shown at 22 in FIG. 4. It has, therefore, not been possible heretofore to use ordinary header quality wire in the manufacture of recessed head products, and as mentioned above, wire specially processed so as to eliminate as much as possible the fine surface nicks and fissures has been required at very considerable increase in the cost of the raw material. However, even with such specially processed wire large volumes of metal, such as for oversize heads, cannot be gathered by the conventional upsetting processes. If it is attempted to upset too long a piece of wire, snaking or folding of the metal will occur providing a fissured mass which is useless for the formation of fastener heads of the type under consideration.

Moreover, in the initial upsetting blow, the bloom 14 is not always perfectly formed, that is, entirely symmetrical. Depending, of course, upon the manner in which it is formed, and the nature of the punch used, the bloom is usually more or less lop-sided. During the following recess punching operation, an extra amount of lateral flow is required of the metal on account of the lop-sided condition of the bloom. This lateral flow may result in unduly stressed areas or even minute tear lines in the finished head as well as undue wear upon the punch, and hence short punch life. Furthermore, upon the initial penetration of the tip of the nib into the narrow upper end of the bloom 12, the bloom is frequently split or torn apart and while the metal is subsequently gathered together and recompacted as the punch advances, the original homogeneity of the metal is destroyed and ultimate strength of the finished head impaired. The tendency of the bloom to split apart upon the penetration thereof by the tip of the punch is due to the small diameter of the end surface of the bloom and also to the fact that the metal was work-hardened to a substantial degree in the formation of the bloom. All of these problems, and others, result from the required enlargement from the small diameter of the starting wire to the large diameter of the finished head.

The improved process of the invention and which eliminates numerous of the disadvantages mentioned above, and others, will now be described with particular reference to FIGURES 5 to 13, inclusive. In accordance with the process of the present invention there is first provided a cylindrical workpiece 24 which preferably has a diameter at least one-half, and preferably about three-fourths, the diameter of the head part of the threaded device which is to be formed and at least 50% greater than and up to about twice the maximum diameter of the recess to be formed in the head thereof. The diameter of a workpiece selected as above ordinarily will have a cross-sectional area of between about one and one-half to two and one-half times that of the shank of the threaded device which is to be formed, thus requiring a reduction of at least fifty percent and more usually up to about seventy percent in area to form such shank. This workpiece may be obtained by severing it from a length of wire 26 of desired diameter in a conventional severing mechanism including a holding die 28 and a cut-off device 30 as indicated in FIG. 5.

The workpiece 24 is thereafter extruded in a concavely curved bottom die while the workpiece is fully confined therein so as to form, as shown in FIG. 7, an elongate shank 32 of the diameter of the blank to be formed and which diameter as indicated above is substantially less than the diameter of the workpiece 24, leaving a substantially unworked head part 34 having a flat end surface 36 of substantially the same diameter as that of the workpiece 24. Shown in FIG. 8 is a preferred form of extrusion die 37 which comprises a cylindrical sidewall portion 38 of a diameter just sufficient to receive the workpiece 24 and which is of a length greater than that of the workpiece 24. The cavity 38 converges at its inner end in a concavely curved work engaging surface 40 to an extrusion orifice 42 having a diameter substantially equal to that of the shank of the headed article. Extrusion pressure may be applied to the workpiece 24 by an extrusion punch 44 so as to force the inner part of the workpiece through the orifice 42 thereby extruding in a single stroke an elongate shank thereon as shown in FIG. 7. As will be apparent, the pressure of the punch 44 will flatten the outer end of the workpiece during the extrusion. The extrusion is stopped when the volume of the unworked head part 34 is equal to that of the head part of the threaded device. Preferably the initial diameter of the wire stock 26 is selected so that at this point the length of the unworked head part 34 is no greater than twice the diameter thereof. For ordinary recessed head screws such as illustrated the head part 34, after the extrusion step, will have a length less than the diameter thereof. The finished workpiece may be knocked from the die 37 by a conventional knock-out pin 46.

It is to be understood that the present invention is not restricted to the use of any particular form of shoulder in the extrusion die. The use of a curved bottom extrusion die, as illustrated in FIG. 8, in the manufacture of headed articles is further described and claimed in my copending application Serial No. 788,833, filed January 26, 1959.

After the formation of the workpiece as shown in FIG. 7, the head part 34 is maintained in a cold, unworked state and homogeneous condition and transferred to a holding die where it is then subjected to a single blow simultaneously to pierce the head part to form the internal wrenching recess therein and to upset the head part to provide the desired outer configuration. The finished blank as shown in FIG. 9 includes a shank 32 and a head 48 having a Phillips type recess 50 punched therein. To accomplish this, the workpiece is positioned in a holding die or anvil 52 having a bore 54 of a diameter snugly to receive the extruded shank of the workpiece and the head part 34 is struck with a punch which is substantially the same as the punch 15 shown in FIG. 3. One of the advantages of the instant process is that it can be performed in a single blow type heading apparatus, a fragmentary portion of which is shown in FIGS. 12 and 13. Such apparatus is more completely shown in Herbert L. Hoyt copending application Serial No. 108,128, filed May 5, 1961. In such apparatus the wire 26 is fed by any conventional mechanism through a feed quill 68 for severance of a workpiece 24 by cut-off mechanism including a member 70, by means of which the workpiece 24, after severance, is transferred to a position opposite the cavity 74 of an extrusion die 76, having a configuration substantially the same as the die 37 previously described. An extrusion punch 78, mounted upon the ram 80 of the heading apparatus, is then advanced toward the die 76 by a conventional driving mechanism (not shown) to push the workpiece from the cutter 72 into the die cavity 74 after which the cutter 72 is retracted. Any conventional mechanism for operating the cutter mechanism may be utilized and has not therefore been illustrated.

The punch 78 is advanced into the cavity 74 to apply extrusion pressure to the workpiece 24 and cause extrusion of a shank therefrom. When the desired amount of extrusion has been obtained the punch 78 is retracted and the workpiece knocked from the die by a knock-out pin 85 and transferred by transfer fingers 84 to a holding die 86 having a bore 88 of a diameter sufficient to receive the extruded shank of the workpiece. The ram 80 is then advanced again to strike the head part 34 of the work-piece a single blow with a heading punch 90 so as simultaneously to punch a recess in the head and to finish form the outer configuration of the head part. Thereafter the ram 80 is retracted and the workpiece knocked out of the die 86 by conventional knockout pin 92. As indicated in FIG. 13 while one piece is extruded in the die 76 the next previously extruded piece is being headed in the die 86. After the head has been shaped the workpiece can be transferred to suitable thread-rolling mechanism. As will be apparent, because of the uniform diameter of the shank, threads can be rolled thereon throughout its entire length.

In the process of the invention, it will be observed that the head part 34 is substantially unworked during the extrusion and, therefore, has not been work hardened prior to the engagement thereof with the forming and piercing punch 15 with the result that the piercing and forming operation can be accomplished with much greater ease than is possible with the prior processes. Since the end surface 36 is broad and flat, and, as indicated previously the wire stock 26 preferably has a diameter between one and one-half to two times the maximum diameter of the nib 16, little, if any, splitting occurs during penetration with the nib 16. It will be observed that the driver receiving recess is formed by moving the punch 16 axially against the flat end surface 36 of the workpiece which causes metal to flow radially outwardly, at least to some extent, from the longitudinal axis of such workpiece over a predetermined axial distance extending from the flat end surface 36. The punch nib 16 is so shaped that a plurality of substantially planar surface areas, or punch areas, are formed which are distributed about the longitudinal axis of the workpiece, at least some of such planar surface areas being disposed in a direction substantially parallel to the workpiece axis whereby to define driver engaging surfaces of the driver receiving recess. Since the head material is more easily worked in the piercing process, and since the head 34 must inherently be perfectly symmetrical and concentric with the shank 32 in each instance, the wear and tear on tools is substantially reduced resulting in longer tool life and more satisfactory performance during the life thereof. On the other hand, the working that occurs in the shank portion 32 as a result of the extrusion is highly desirable for it very materially increases the strength of the shank.

In the manufacture of a flat head, or countersunk, type screw, the advantages of the present process are even more pronounced. Referring to FIG. 11, a workpiece 56, similar to workpiece 32, is shown in a die 58 having a counter-sunk head forming cavity 60. In this instance the unworked head portion 62 of the workpiece conforms approximately to the shape of the cavity so that the metal of the portion 62 is subjected to even less working when it is pierced with the final forming punch 64 than in the case of a round head type screw. In any event, however, the concave die surface, e.g. the shoulder 18 of the punch 15, or the conical shoulder 60 of the holding die 58 surrounding the extruded portion 34 of the workpiece, controls the concurrent outward flow of metal of the workpiece sequentially and substantially simultaneously with the piercing of said workpiece portion by the punch nib 16 so as to provide the desired external configuration surrounding the driver receiving recess.

These factors all contribute to make it possible to utilize less expensive stock material for the manufacture of fasteners for ordinary, conventional uses. Elimination of the preliminary gathering step to form the bloom 14 eliminates in large part the problems caused by fissures and surface cracks in the stock material so that the use of special process wire is not required. It will be observed, with reference to FIG. 7, that very little of the outer surface of the blank remains in the head portion 34, and even if a nick or scratch, such as 20, should occur in this area, the probabilities are that it would be ultimately located in the under surface of the head 48 where it could do no harm. In fact, low cost ordinary mill run, header wire having the usual surface defects associated with such wire may be successfully used even for the manufacture of Phillips recessed-head products.

Another advantage of the process of the invention in eliminating any substantial work-hardening of the head part 34 prior to the piercing and forming operation is that recessed-head fasteners of stainless steel, and other special alloys having high work-hardening characteristics, can be formed successfully by the process of the invention. Such alloys as are referred to cannot be used in conventional prior art processes as described above. Such alloys are work-hardened to such an extent by the first upsetting blow, illustrated in FIG. 2, that the workpiece cannot be subsequently further worked, such as by the punch 15, without first annealing the partially formed workpiece. With the present process the formation of headed products from such special alloys presents no problem. An incidental advantage is that since shanks of virtually any desired diameter can be extruded from the initial workpiece 24, the number of different diameters of wire stock required to be carried by a manufacturer can be reduced substantially. A further important advantage of the present invention resides in the fact that the amount of metal left in the head portion 34 of the blank can be very accurately controlled. Obviously, in shearing off the lengths 24 from the wire 26 small variations in the volume of the metal will inherently occur. In conventional processes these variations are reflected in the size of the bloom, which is very undesirable. In the present process, the variation is transmitted to the shank which is usually not critical, while the size of the head is maintained constant so as properly to fill out the punch and die cavity for precise and accurate formation of the finished head.

While the invention has been described with particular reference to the manufacture of a recessed-head type fastener, that is one having a Phillips type recess therein, the process is also applicable to the manufacture of fasteners having other types of internal wrenching recesses, as well as other headed products. All of such recesses, however, are provided with a plurality of substantially planar surface areas, i.e. punch formed areas, distributed about the longitudinal axis of the workpiece, at least some of such planar surface areas being disposed in a direction substantially parallel of said axis whereby to define driver engaging surfaces of the driver receiving recess. By the term "internal wrenching recess," applicant means recesses which are completely surrounded by metal, including not only Phillips type recesses, but also, square, hex, 12-point, serrated, and the like, recesses. Such recesses may also be termed sockets and are to be distinguished from simple nicks, or slots.

This application is a continuation-in-part of my co-pending application Serial No. 844,985, filed October 7, 1959, and now abandoned.

Having illustrated and described a preferred embodiment of the invention, it should be apparent to those skilled in the art that the invention permits of modification in arrangement and detail. I claim as my invention all such modifications that come within the true spirit and scope of the appended claims.

I claim:

1. The method for manufacturing a blank for a threaded device having an enlarged head provided with a driver receiving internal wrenching recess having portions extending outwardly toward, but spaced inwardly from, the perimeter of the head, and a threaded shank, said method comprising:
   a. providing a workpiece of circular cross section, of predetermined diameter and of a predetermined length materially greater than said diameter,
   b. said diameter being approximately from one and one-half times to two and one-half times greater than the diameter of the shank of said device,
   c. applying endwise pressure by means of a flat ended punch on said workpiece while positioned wholly within the cavity of an extrusion die to extrude the greater portion of said workpiece to form an elongate shank and to form a flat end surface on the unextruded portion of the workpiece,
   d. terminating said pressure at such point that the unextruded portion of said workpiece within said die is reduced to a volume corresponding substantially to the volume of metal comprising the enlarged head of the device,
   e. removing said workpiece from said extrusion die, maintaining said unextruded portion in a cold unworked state and homogeneous condition, positioning said workpiece so maintained in a holding die having a bore snugly receiving said extruded shank,
   f. and then while said extruded portion is still in a cold, unworked state and homogeneous condition forming a recess by moving a punch axially against said flat end surface of said workpiece causing metal to flow radially outwardly from the longitudinal axis of said workpiece over a predetermined axial distance extending from said flat end surface, providing a plurality of substantially planar surface punch areas distributed about said axis, at least some of said planar surface areas being disposed in a direction substantially parallel to said axis whereby to define driver engaging surfaces of a driver receiving recess, and sequentially and substantially simultaneously by means of a concave die surface surrounding said unextruded portion of said workpiece controlling the concurrent outward flow of metal of said workpiece portion so as to provide the desired external head configuration surrounding said recess,
   g. said flat end surface of said workpiece having a diameter substantially greater than the maximum transverse dimension of said recess forming punch portion whereby the metal flowing outwardly around said punch during the piercing operation maintains its homogeneity to form a rim free of detrimental cracks surrounding said recess.

2. The method according to claim 1 wherein during said application of endwise pressure the further step is included of simultaneously supporting the sides of said workpiece throughout the full longitudinal extent thereof against substantial lateral deformation.

3. The method according to claim 1 wherein during said application of endwise pressure the further step is included of maintaining said pressure while extruding said elongate shank in a single step to the final cross-sectional area and shape of the shank of the blank which is to be threaded.

References Cited in the file of this patent

UNITED STATES PATENTS

| | | |
|---|---|---|
| 397,208 | Thayer | Feb. 5, 1889 |
| 1,885,288 | Pracny | Nov. 1, 1932 |
| 2,113,172 | Cordes | Apr. 5, 1938 |
| 2,621,344 | Friedman | Dec. 16, 1952 |

FOREIGN PATENTS

| | | |
|---|---|---|
| 13,715 | England | Nov. 17, 1910 |
| 278,340 | Switzerland | Oct. 15, 1951 |

UNITED STATES PATENT OFFICE
CERTIFICATE OF CORRECTION

Patent No. 3,089,159                          May 14, 1963

Raymond Harold Carlson

It is hereby certified that error appears in the above numbered patent requiring correction and that the said Letters Patent should read as corrected below.

Column 8, line 3, for "extruded" read -- unextruded --.

Signed and sealed this 26th day of November 1963.

(SEAL)
Attest:

ERNEST W. SWIDER

Attesting Officer

EDWIN L. REYNOLDS

Acting Commissioner of Patents